United States Patent [19]
Rangedahl et al.

[11] Patent Number: 5,790,074
[45] Date of Patent: Aug. 4, 1998

[54] AUTOMATED LOCATION VERIFICATION AND AUTHORIZATION SYSTEM FOR ELECTRONIC DEVICES

[75] Inventors: Lars Rangedahl, Fountain Valley; Gregory Ratajski, Santa Ana; Andrew Ying-Tsai Chien, Buena Park; James Wang, Mission Viejo, all of Calif.

[73] Assignee: Ericsson, Inc., Research Triangle Park, N.C.

[21] Appl. No.: 689,889

[22] Filed: Aug. 15, 1996

[51] Int. Cl.⁶ .................................................. G01S 5/02
[52] U.S. Cl. .......................... 342/357; 342/457; 380/23; 340/825.54
[58] Field of Search .......................... 342/457, 357; 340/825.54; 380/23

[56] References Cited

U.S. PATENT DOCUMENTS

| | | | |
|---|---|---|---|
| 5,021,794 | 6/1991 | Lawrence | 342/457 |
| 5,214,700 | 5/1993 | Pinkas et al. | 380/25 |
| 5,334,987 | 8/1994 | Teach | 342/357 |
| 5,497,145 | 3/1996 | Fast | 340/988 |
| 5,537,102 | 7/1996 | Pinnow | 340/825.3 |
| 5,576,952 | 11/1996 | Stutman et al. | 364/413.02 |

OTHER PUBLICATIONS

*UTAM, Inc. Policies and Procedures Manual—Unlicensed Transition And Management for Microwave Relocation in the 2GHz. band.* UTAM, Inc. Last Revision Date: Feb. 29, 1996.

*Primary Examiner*—Thomas H. Tahcza
*Assistant Examiner*—Dao L. Phan
*Attorney, Agent, or Firm*—Jenkens & Gilchrist, P.C.

[57] ABSTRACT

A system for remotely and automatically verifying the location of an electronic device and authorizing operation of the device if it resides in an allowed geographical location. The system includes a remote device requiring authorization to operate and an authorization device connected to an authorization database. The remote device and authorization device being connected via a communication link. Methods for verification include employing a Global Positioning System receiver in the monitored device and using the telephone number of the monitored device.

8 Claims, 7 Drawing Sheets

AUTOMATED LOCATION VERIFICATION AND AUTHORIZATION SYSTEM FOR ELECTRONIC DEVICES

BACKGROUND OF THE INVENTION

1. Technical Field of the Invention

The present invention pertains in general to the remote authorization of electronic device operation, and more particularly, to the remote authorization of wireless telephone operation based on location of the telephone.

2. Description of Related Art

Use of wireless communications has grown dramatically during the past several years and growth in demand is expected to continue. The Federal Communication Commission (FCC) has responsibility for overseeing the use of the radio frequency spectrum used by wireless technology. On occasions, the FCC deems it necessary to relocate one group of users occupying a band of frequencies to a new band of frequencies in order to allow a new group of users access to the previously occupied band. During such a transition period, it is desirable to allow the new users to operate in geographical locations where previous users have been relocated. To prevent interference with user groups which have not yet relocated, however, new users must be prevented from operating in certain geographical locations. Such is the case for relocation in the 2 GHz band where the FCC has adopted the Unlicensed Transition And Management (UTAM) policies and procedures for microwave relocation.

UTAM is a temporary Federal Communication Commission approved coordinator overseeing the deployment of the unlicensed Personal Communication Service (PCS) including wireless telephone technology in the small office/home office (SOHO) environment using the 1920 MHz to 1930 MHz radio frequency spectrum. This application of wireless telephone technology can be viewed as a cordless telephone system for the SOHO environment.

The radio frequency band allotted to the SOHO application was formerly used by licensed microwave communications networks. While most licensees have been relocated to other frequencies, several still remain. Until all former licensees of this frequency have been relocated, use of the frequencies for SOHO applications will be prohibited in certain geographic locations where the former users still operate in order to prevent interference on the remaining microwave communications networks.

However, under current UTAM policies and procedures, devices may operate in the affected frequencies if prior authorization is received.

The requirement for authorization occurs not only upon initial power up of the device, but also on power up occurring any time after the device has been powered down for a period longer than eight hours following authorized operation. Current authorization schemes include an on-site visit by a certified person who would normally enable the device with an authorization key or a mail-in procedure. Both of these options are time consuming and man power intensive.

Although it is desirable to prevent interference in this frequency band until the transition is complete, the FCC's goal also includes a desire for broad based acceptance of the SOHO applications. As such, it is desirable to make the authorization process as quick, inexpensive, and transparent to the user as possible. In view of the delay, expense, and cumbersome nature of the manual and mail-in authorization procedures suggested by UTAM, there is a need for an automated authorization system.

SUMMARY OF THE INVENTION

The present invention comprises an automated system for determining the geographical location of an electronic device, verifying whether it is authorized to operate in its present geographical location, and enabling its operation if the device resides in an authorized location. The system includes the electronic device whose location is to be monitored (the monitored device), and an authorization device for determining the allowability of operation in a given location and then authorizing or denying operation. A communication link, preferably using the Public Switched Telephone Network (PSTN), is provided for communication between the monitored device and the authorization device.

In addition to performing its intended operation, the monitored device also contains functionality for enabling and disabling normal operation of the device, functionality for requesting authorization to enable normal operation, and functionality for communication with the authorization device.

Within the authorization device is functionality for determining if operation at a given location is allowed, functionality for generating an authorization key, and functionality for communication with the monitored device. The authorization device also has access to a database containing information for determining the allowability of operation at a given location.

A first embodiment of the automated authorization system uses a Global Positioning System (GPS) to determine the location of the monitored device with the GPS receiver residing in the monitored device. A second embodiment uses the telephone number used by the monitored device when requesting authorization to determine location. Contained within the authorization device is functionality for retrieving the telephone number from the PSTN used for communications between the monitored device and the authorization device. This ability to determine a telephone number via the PSTN is commonly referred to as Caller ID.

The sequence for authorizing operation of the monitored device begins with the monitored device determining that power up has occurred. If the monitored device has not been in authorized operation within some past predetermined time period, it will request authorization from the authorization device via a communications link. In implementations where GPS is used, longitude and latitude coordinates for the present location will also be provided to the authorization device.

Upon receiving a request for authorization, the authorization device makes a determination as to whether GPS information or the telephone number of the monitored device is to be used to verify location of the monitored device. If the telephone number is to be used, the authorization device obtains the telephone number from the Public Switched Telephone Network. The authorization device now obtains information from a database regarding the allowability of operation at the given location and generates an authorization key if operation is allowed. Finally, the authorization device transmits either the authorization key or a denial message to the monitored device and the communication link is terminated. Upon receiving a response to its request for authorization, the monitored device either uses the authorization key to permit normal operation or remains disabled.

BRIEF DESCRIPTION OF THE DRAWINGS

For a more complete understanding of the present invention, reference is made to the following description taken in conjunction with the accompanying drawings wherein.

DETAILED DESCRIPTION OF THE INVENTION

Figure 1:
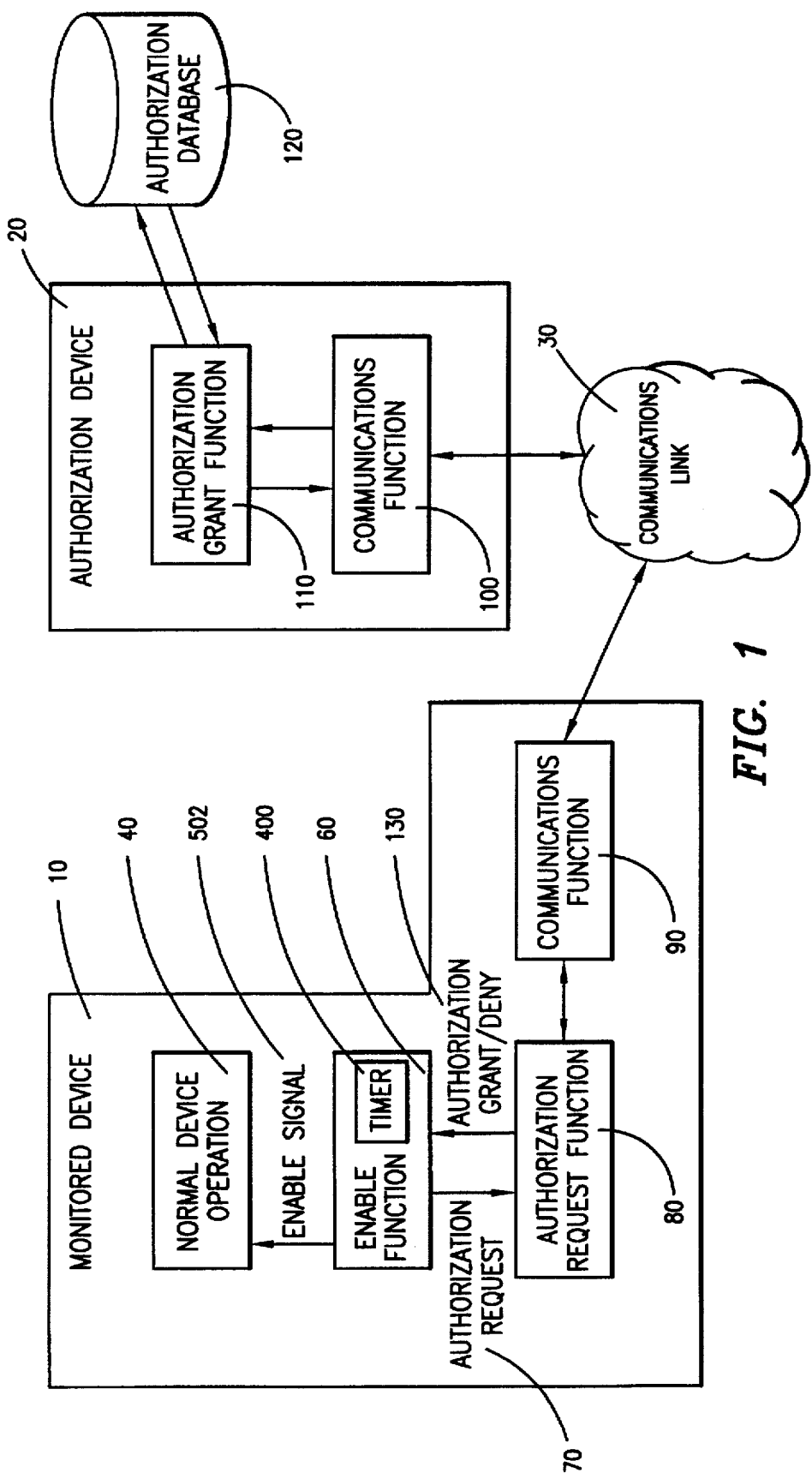
FIG. 1 is a functional block diagram of an automated location verification and authorization system.

Referring now to FIG. 1, there is illustrated a functional block diagram of an automated location verification and authorization system. The system comprises a monitored device 10 and an authorization device 20 which are connected via a communications link 30 during the authorization process. The monitored device 10 possesses normal device operability 40 which although not part of invention, is enabled to operate only after verification of monitored device geographical location and authorization of operation at that location.

For purposes of this disclosure, a Personal Communication Service (PCS) using wireless telephone technology for the small office/home office (SOHO) environment will constitute the normal device operation 40. This application is similar to a cordless telephone system for the SOHO environment. Although a PCS application is described in this disclosure, it is understood that the type of operability is immaterial to the invention and therefore, could extend to any electronic device or software running on an electronic device.

The preferred embodiment of this invention uses the Public Switched Telephone Network (PSTN) as the communications link 30. While the PSTN is the preferred mode of communication, any bidirectional communication including, but not limited to, radio communications, satellite transmissions, and cable networks may be employed.

For normal operation to occur, the normal device operation 40 must receive an enable signal 50 from an Enable Function 60. Without transmission of the enable signal 50, normal operation remains disabled. The Enable Function 60 is responsible for determining when to request authorization and makes the request by sending an authorization request signal 70. Once the authorization request signal 70 is sent, an Authorization Request Function 80 begins the authorization process. The process, described in greater detail later in FIGS. 3 and 5, begins with the Authorization Request Function 80 directing a Communication Function 90 to establish a communications link with the authorization device 20 via the communications link 30. The communication protocol between the monitored device 10 and the authorization device 20 can be of any type such as standard RS-232 by way of example.

Once communication with the authorization device has been established, the Authorization Request Function 80 transmits an authorization request. The Authorization Request Function 80 may also transmit other information regarding the status of the monitored device 10 such as its serial number at this time.

The authorization device 20 begins the location verification process when a Communications Function 100 establishes communication with the monitored device 10 via the communications link 30 and the Communications Function 90. An Authorization Grant Function 110 then receives the authorization request and status information sent by the Authorization Request Function 80 and accesses an authorization data base 120 where information regarding the allowability of operation in various geographical locations is stored.

After making a determination as to whether operation is allowed at this location, the Authorization Grant Function 110 transmits its response to the Authorization Request Function 80 which in turn grants or denies enabling to the Enable Function 60 via an authorization grant/deny signal 130. If authorized to operate, the Enable Function 60 enables normal operation via the enable signal 50.

In a first embodiment of the invention, the method for verifying the location of the monitored device uses a Global Positioning System (GPS) and in a second embodiment of the invention, the telephone number of the monitored device is used. The embodiment employing a GPS has the advantage of providing latitude and longitude coordinates to within a few meters of the actual location. This relatively high degree of accuracy, however, comes with the added cost of equipping each monitored device with a GPS receiver.

The second embodiment, using the telephone number of the monitored device used during the authorization process to determine geographical location, can only identify location to within the region where the telephone number could exist. Knowing the telephone number used by the monitored device to request authorization allows a determination of the geographical region serviced by the particular area code. To obtain a more exact location, the local telephone number prefix will identify the central office servicing the telephone number and the location can be narrowed to the region using this telephone number prefix. Although this method does not provide as accurate a location as does the GPS, it is relatively inexpensive to implement. Using a service provided by the Regional Bell Operating Companies (RBOC) commonly referred to as Caller ID or caller identification, a single inexpensive caller identification device for extracting the telephone number from the PSTN is installed in the authorization device. There is an additional method for obtaining the location of the monitored device which is not as precise as the GPS but provides greater accuracy than the telephone number prefix. The telephone company possesses the capability to provide the street address of a calling party which in this application, would be the monitored device. While this capability exists, it is not a commonly offered option for the average telephone service subscriber and special arrangements need to be made with the telephone company.

To meet the FCC's location verification requirements set forth in the Unlicensed Transition and Management (UTAM) policies and procedures for the PCS application described in this disclosure, both methods of location verification are employed. In large geographical regions where all former users of the frequency band have been relocated and little chance of interference exists, the telephone number of the monitored device is sufficient enough to be used to determine location. In congested areas where former users remain, it is desirable to obtain a more accurate location and in these situations GPS is used.

GPS Based Location Verification

Figure 2:
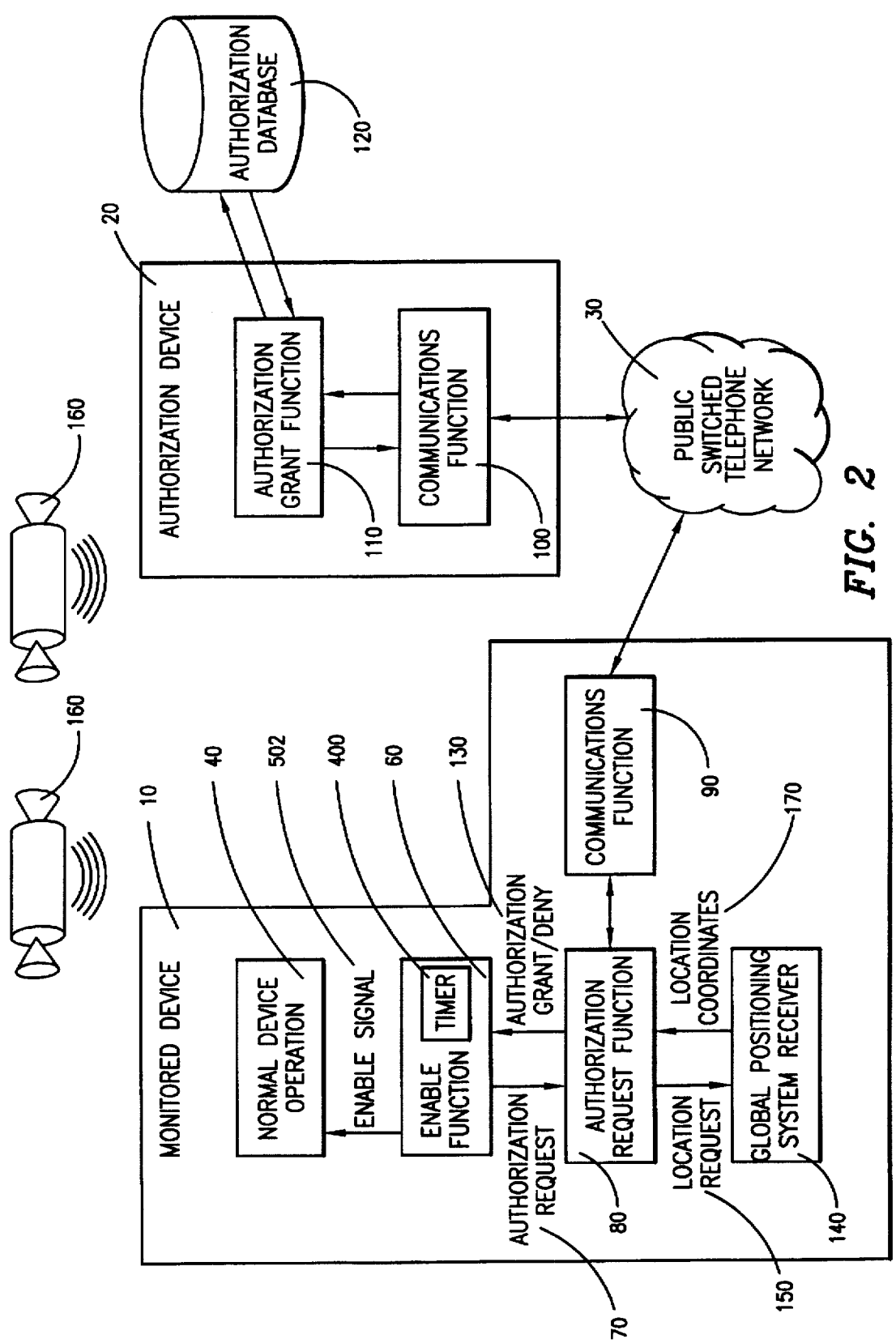
FIG. 2 is a functional block diagram of an automated location verification and authorization system using a Global Positioning System to determine location.

Referring now to FIG. 2, there is illustrated a functional block diagram of an automated location and verification system employing a GPS for identifying location. In addition to the functional blocks illustrated in FIG. 1, the GPS based system also includes a GPS receiver 140 located within the monitored device 10. To request the location of the monitored device, the Authorization Request Function 80 transmits a location request signal 150. The GPS receiver 140 then listens for satellite transmissions 160 and determines latitude and longitude coordinates which are communicated to the Authorization Request Function 80 via location coordinates signals 170. The Authorization Request Function 80 subsequently transmits the location coordinates to the authorization device 20.

Figure 3A:
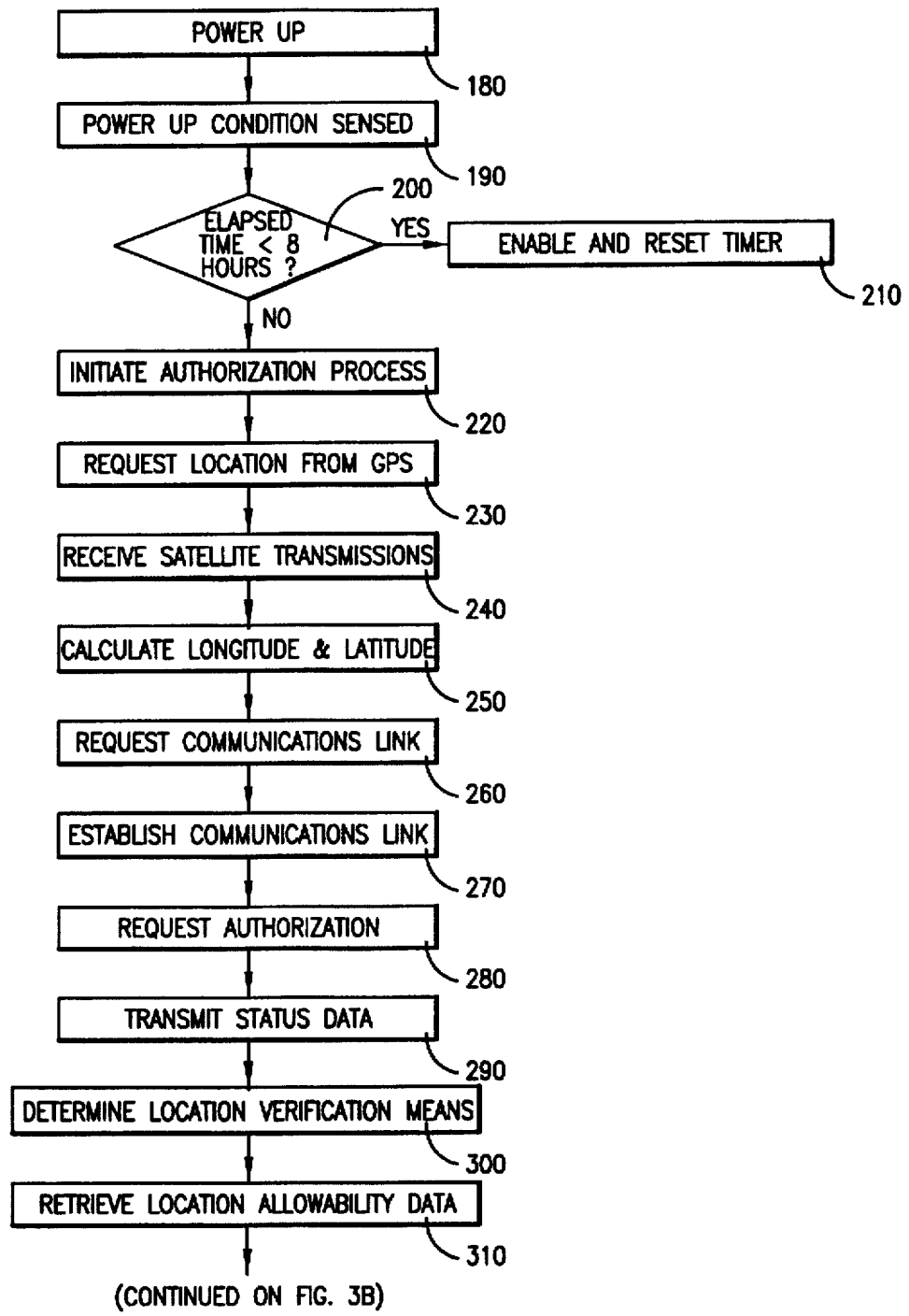
FIG. 3 is a flowchart of the authorization process for the system of FIG. 2.
Figure 3B:
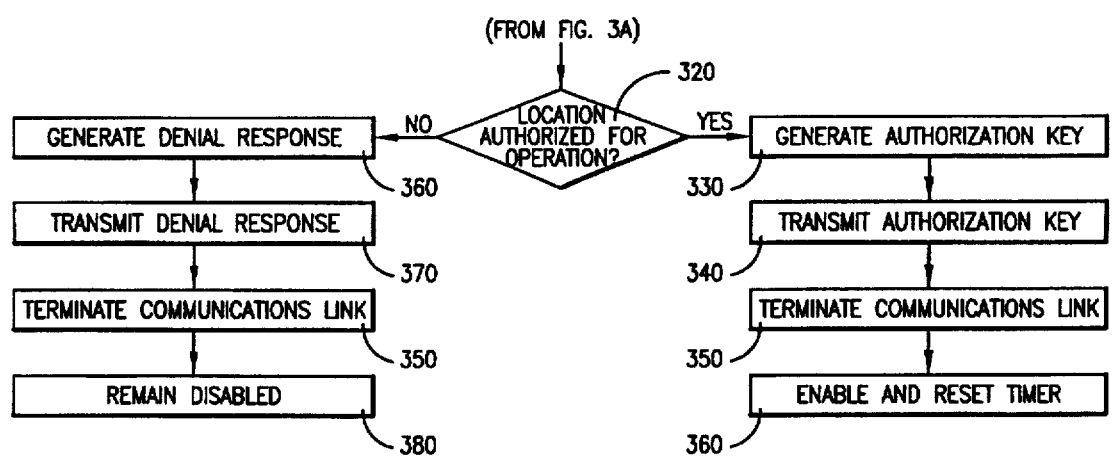

Referring now to both FIG. 3, where there is illustrated a flow diagram of the GPS based authorization process, and FIG. 2, where there is illustrated a functional block diagram of the same GPS system. FIG. 3 provides greater detail of the process which occurs within the functional blocks of FIG. 2. It is important to understand that these functions can be implemented in hardware dedicated solely to the described functions or may be implemented in software running on a general purpose computer.

The process begins with the monitored device 10 being powered up (step 180). Power up can either mean the conventional connotation of applying line voltage to the device or in the case of the PCS application described herein, power up means being connected to the PSTN. In either case, the Enable Function 60 will sense the power up condition (step 190). Inside the Enable Function 60 is a battery powered count down timer 400 (FIG. 2), which is initially set to zero prior to operation or authorization of the monitored device 10. Each time the normal device operation 40 is authorized and enabled the timer is reset to a value representing an eight hour duration. Simply powering up the monitored device 10 will not reset the timer 400. The monitored device 10 must be authorized for the timer 400 to be reset. Immediately following a power down, the timer begins to count down and reaches zero in eight hours. After sensing a power up condition (step 190) the Enable Function 60 checks to see if time remains on the eight hour timer (step 200). If time remains, indicating that less than eight hours have passed since the last authorized operation of the device, then the Enable Function 60 enables the device (step 210). If no time remains on the timer then the Enable Function transmits the authorization request signal 70 and initiates the authorization process (step 220).

Once the authorization process is initiated, the Authorization Request Function 80 requests location information from the GPS (step 230). The GPS receiver 140 receives (step 240) satellite transmission 160 (FIG. 2), and calculates longitude and latitude coordinates (step 250). These coordinates are communicated to the Authorization Request Function 80 via the signal lines 170. The Authorization Request Function 80 then requests the Communications Function 90 to establish a communications link (step 260). The Communications Function 90 establishes a communications link (step 270) to the authorization device 20 via the PSTN 30.

At this point the Authorization Request Function 80 of the monitored device 10 is in communication with the Authorization Grant Function 110 of the authorization device 20. The Authorization Request Function 80 now transmits a request for authorization (step 280) followed by a transmission containing status data (step 290) which includes longitude and latitude coordinates and may contain the device serial number among other possible data. The monitored device 10 now waits for a response from the authorization device 20.

Having received an authorization request (step 280) and status data (step 290), the Authorization Grant Function now determines whether the location verification means for this device is based on GPS or by telephone number (step 300). There are several possible ways to make this determination. one approach would be to provide the authorization device 20 with two separate access telephone numbers and assign one line for GPS based systems and the other one for telephone number based systems. In another approach, the Authorization Grant Function 110 could map the monitored device's 10 serial number to a pre-existing list containing the location verification means for all serial numbers. In yet another approach, the Authorization Grant Function 110 could check for the existence of longitude and latitude coordinates in the data transmission (step 290).

Using any of the approaches to determine the location verification means, the Authorization Grant Function 110 realizes this is a GPS based system and retrieves location allowability data for this location (step 310) from the authorization database 120. The Authorization Grant Function 110 uses the data to make a determination as to whether operation is allowed at the given geographical location (step 320) and if operation is allowed, generates an authorization key (step 330), transmits the authorization key (step 340), and instructs the Communications Function 100 to terminate the communications link (step 350). If operation is prohibited at this location, the Authorization Grant Function 110 generates a denial response (step 360), transmits the denial response (step 370), and terminates the communications link (step 350).

Upon receiving authorization from the Authorization Grant Function 110, the Authorization Request Function 80 uses the authorization key to authorize enablement via the authorization grant/deny signal 130 whereupon, the Enable Function 60 will enable normal device operations (step 360) and reset the eight hour timer. Should the response be a denial, the Authorization Request Function 80 instructs the Enable Function 60 to remain disabled (step 380) via the authorization grant/denial signal 130.

Telephone Number Based Location Verification

Figure 4:
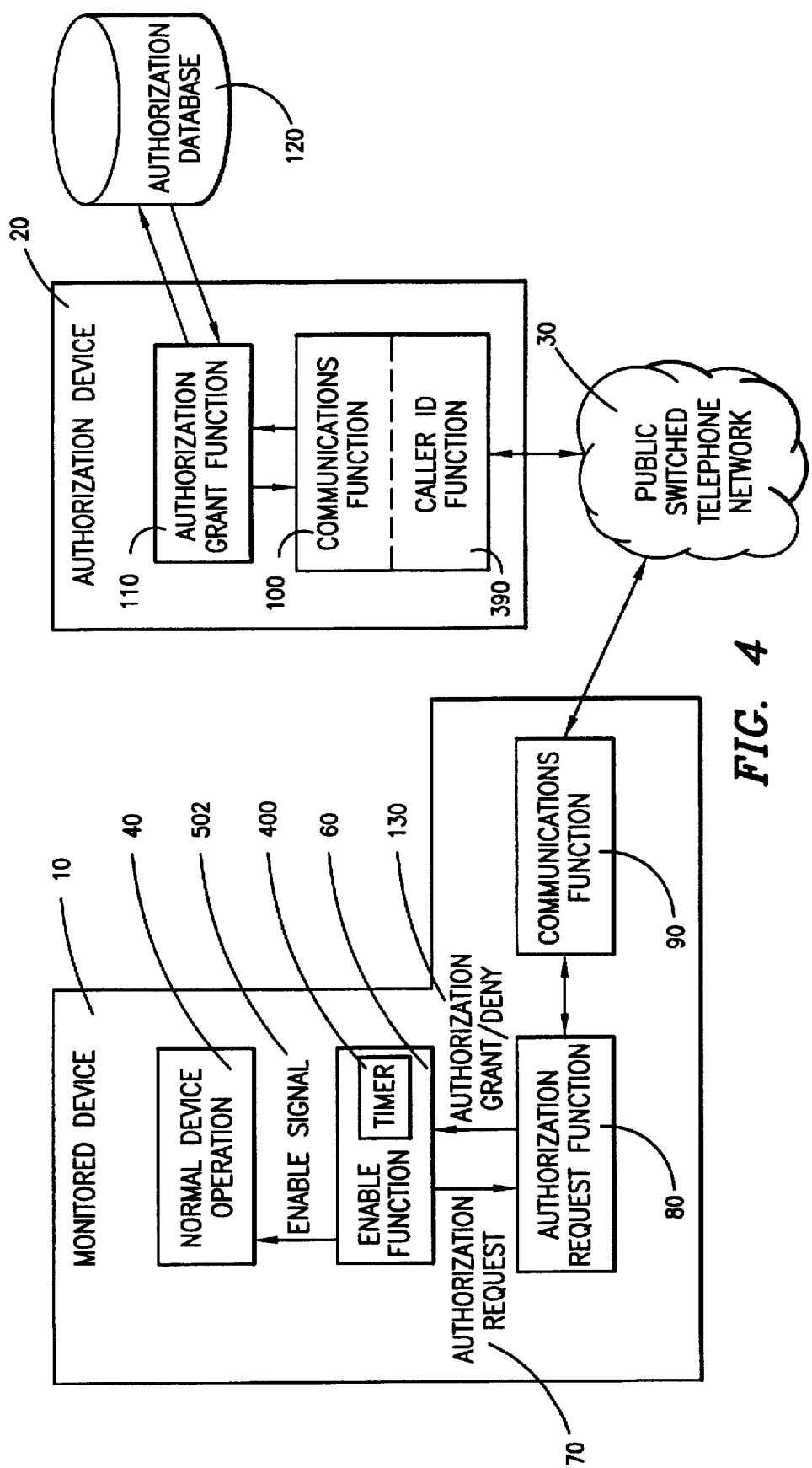
FIG. 4 is a functional block diagram of an automated location verification and authorization system using the monitored device telephone number used in the authorization process to determine location.

Referring now to FIG. 4, there is illustrated a functional block diagram of a telephone number based automated location verification and authorization system. In addition to the functional blocks described in FIG. 1, the telephone number based system also includes a Caller ID Function 390 located within the Communications Function 100 of the authorization device 20. As earlier stated, this function extracts, from the PSTN, the telephone number used by the monitored device 10 when requesting authorizations to enable device operation.

Figure 5A:
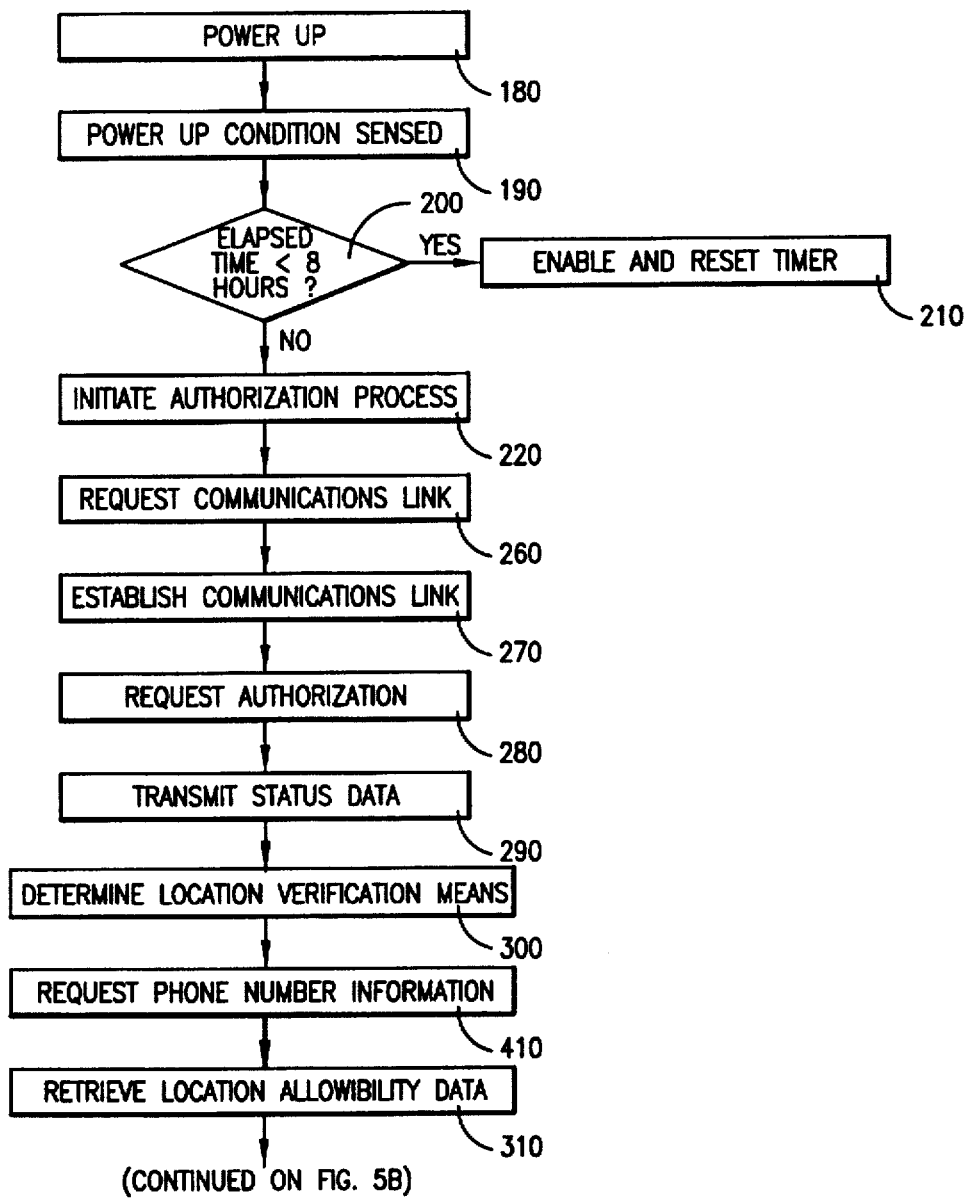
FIG. 5 is a flowchart of the authorization process for the system of FIG. 4.
Figure 5B:
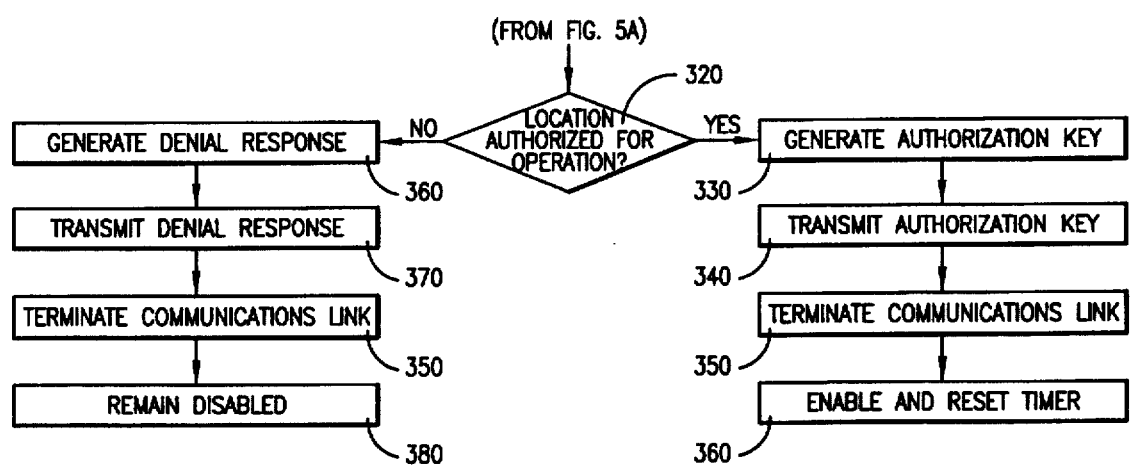

Referring now to both FIG. 5, where there is illustrated a flow diagram of the telephone number based authorization process and FIG. 4, where there is illustrated a functional block diagram of the same telephone number based system. FIG. 5 provides greater detail of the process which occurs within the functional blocks of FIG. 4. Again, it is important to understand that these functions can be implemented in hardware dedicated solely to the described function or may be implemented in software running on a general purpose computer.

The process begins with the monitored device 10 being powered up (step 180). Power up can either mean the conventional connotation of applying line voltage to the device or in the case of the PCS application described herein, power up means being connected to the PSTN. In either case, the Enable Function 60 will sense the power up condition (step 190). Inside the Enable Function 60 is a battery powered count down timer 400 (FIG. 4), which is initially set to zero prior to operation or authorization of the monitored device 10. Each time the normal device operation 40 is authorized and enabled the timer is reset to a value representing an eight hour duration. Simply powering up the monitored device 10 will not reset the timer 400. The monitored device 10 must be authorized for the timer 400 to be reset. Immediately following a power down, the timer begins to count down and reaches zero in eight hours. After sensing a power up condition (step 190) the Enable Function 60 checks to see if time remains on the eight hour timer (step 200). If time remains, indicating that less than eight hours have passed since the last authorized operation of the device, then the Enable Function 60 enables the device (step 210). If no time remains on the timer then the Enable Function transmits the authorization request signal 70 and initiates the authorization process (step 220).

Once the authorization process is initiated, the Authorization Request Function 80 requests the Communications Function 90 to establish a communications link (step 260). The Communications Function 90 establishes a communications link (step 270) to the authorization device 20 via the PSTN 30.

At this point the Authorization Request Function 80 of the monitored device 10 is in communication with the Authorization Grant Function 110 of the authorization device 20. The Authorization Request Function 80 now transmits a request for authorization (step 280) followed by a transmission containing status data (step 290) which may contain the device serial number among other possible data. The monitored device 10 now waits for a response from the authorization device 20.

Having received an authorization request (step 280) and status data (step 290), the Authorization Grant Function now determines whether the location verification means for this device is based on GPS or by telephone number (step 300). There are several possible ways to make this determination. One approach would be to provide the authorization device 20 with two separate access telephone numbers and assign one line for GPS based systems and the other one for telephone number based systems. In another approach, the Authorization Grant Function 110 could map the monitored device's 10 serial number to a pre-existing list containing the location verification means for all serial numbers. In yet another approach, the Authorization Grant Function 110 could check for the existence of longitude and latitude coordinates in the data transmission (step 290).

Using any of the approaches to determine the location verification means, the Authorization Grant Function 110 realizes this is a telephone number based system and requests the telephone number (step 410) used by the monitored device 10 to request authorization. This telephone number has been extracted from the PSTN by the Caller ID Function 390 contained within the Communications Function 100. It should be understood that although FIG. 2 does not contain the Caller ID Function, in actual use the authorization device 20 would contain the Caller ID Function 390 to accommodate both means of location verification.

After obtaining the telephone number, the Authorization Grant Function 110 retrieves location allowability data for this location (step 310) from the authorization database 120. The Authorization Grant Function 110 uses the data to make a determination as to whether operation is allowed at the given geographical location (step 320) and if operation is allowed, generates an authorization key (step 330), transmits the authorization key (step 340), and instructs the Communications Function 100 to terminate the communications link (step 350). If operation is prohibited at this location, the Authorization Grant Function 110 generates a denial response (step 360), transmits the denial response (step 370), and terminates the communications link (step 350).

Upon receiving authorization from the Authorization Grant Function 110, the Authorization Request Function 80 uses the authorization key to authorize enablement via the authorization grant/deny signal 130 whereupon, the Enable Function 60 will enable normal device operations (step 360) and reset the eight hour timer. Should the response be a denial, the Authorization Request Function 80 instructs the Enable Function 60 to remain disabled (step 380) via the authorization grant/denial signal 130.

The following examples are provided to more fully understand the situations in which each method of location verification is deployed. In one example, assume the PCS wireless telephone technology is located in a SOHO environment in a remote location of Montana and further assume that all former users of the radio frequency band at that location have been relocated. In this situation, there is little to no chance of interference with former users of the radio frequency and the telephone number of the monitored device is sufficient for location verification even though the area code or telephone number prefix covers a large area.

Contrast the previous example with that of locating the PCS wireless telephone technology in New York City where it is assumed that some former users remain. In this situation, despite the fact that the area codes and telephone prefixes can verify the location of the monitored device with greater accuracy than in the Montana example, the degree of accuracy may not be sufficient. In this location it is likely that there will be interference with former users and accurate location information is required, thereby necessitating the use of GPS.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications, and substitutions without departing from the spirit of the invention as set forth and defined by the following claims.

What is claimed is:

1. A system for enabling operation of a device comprising:
   a monitored device capable of performing a designed operation;
   a global positioning system receiver positioned within the monitored device for determining the geographical location of the monitored device;
   a timer for counting down from a maximum time period whenever the monitored device is powered-down, the timer being reset to the maximum time period whenever the monitored device receives an authorization signal or whenever the monitored device is powered-up and the timer has not reached a count of zero;
   an enabler for enabling performance of the designed operation whenever the timer does not have a zero count; and
   an authorization device including means for verifying the geographical location of the monitored device determined by the global positioning receiver as an authorized location and responsive thereto sending the authorization signal to the monitored device.

2. A system for enabling operation of a device comprising:

a monitored device capable of performing a designed operation and further capable of placing a telephone call across a public switched telephone network;

an authorization device for sending an authorization signal to the monitored device whenever the monitored device is in an authorized location;

a communications link over the public switched telephone network connecting the monitored device to the authorization device;

a caller identification device resident within the authorization device capable of obtaining a monitored device telephone number from the public switched telephone network; and a database accessible by the authorization device for translating the monitored device telephone number into a location.

3. The system for enabling operation of a device as recited in claim 2, further comprising:

a timer for counting down from a maximum time period whenever the monitored device is powered-down, the timer being reset to the maximum time period whenever the monitored device receives the authorization signal or whenever the monitored device is powered-up and the timer has not reached a count of zero; and an enabler for enabling performance of the designed operation whenever the timer does not have a zero count.

4. The system for enabling operation of a device as recited in claim 1, wherein the monitored device transmits the geographical location determined by the global positioning receiver to the authorization device via a radio communications link.

5. The system for enabling operation of a device as recited in claim 1, wherein the monitored device transmits the geographical location determined by the global positioning receiver to the authorization device via a satellite transmission link.

6. The system for enabling operation of a device as recited in claim 1, wherein the monitored device transmits the geographical location determined by the global positioning receiver to the authorization device via a cable network.

7. A method for enabling operation of a device comprising the steps of:

identifying the device location;

generating an authorization signal whenever the device is in an allowed geographical location;

counting down from a maximum time period whenever the device is powered-down from authorized operation; and enabling the device whenever the device receives an authorization signal or whenever the device is powered up and the count has not reached zero.

8. A method for enabling operation of a device comprising the steps of:

placing a telephone call from the device to an authorization device;

identifying the device telephone number;

determining if the device telephone number corresponds to an authorized location; and enabling the device if present at an authorized location.

* * * * *